United States Patent
Hill et al.

(10) Patent No.: US 7,407,546 B2
(45) Date of Patent: Aug. 5, 2008

(54) METHOD OF REMOVING AMMONIA FROM FLY ASH AND FLY ASH COMPOSITION PRODUCED THEREBY

(75) Inventors: Russell L. Hill, San Antonio, TX (US); Carmel Jolicoeur, Quebec (CA); Thi Cong To, Quebec (CA)

(73) Assignee: Boral Material Technologies Inc., San Antonio, TX (US)

( * ) Notice: Subject to any disclaimer, the term of this patent is extended or adjusted under 35 U.S.C. 154(b) by 0 days.

(21) Appl. No.: 11/970,431

(22) Filed: Jan. 7, 2008

(65) Prior Publication Data
US 2008/0110374 A1    May 15, 2008

Related U.S. Application Data

(62) Division of application No. 11/218,379, filed on Sep. 2, 2005, now Pat. No. 7,329,397.

(51) Int. Cl.
C04B 24/12    (2006.01)

(52) U.S. Cl. .................. 106/727; 106/705; 106/DIG. 1

(58) Field of Classification Search ................ 106/727, 106/705, DIG. 1; 423/237, 235
See application file for complete search history.

(56) References Cited

U.S. PATENT DOCUMENTS

| 6,063,979 | A  | 5/2000  | Miyata et al. |
| 6,077,494 | A  | 6/2000  | Gasiorowski et al. |
| 6,291,737 | B1 | 9/2001  | Miyata et al. |
| 6,746,654 | B2 | 6/2004  | Mehta et al. |
| 6,755,901 | B1 | 6/2004  | Ramme et al. |
| 6,790,264 | B2 | 9/2004  | Minkara |
| 2003/0147795 | A1 | 8/2003 | Mehta et al. |
| 2003/0205173 | A1 | 11/2003 | Minkara |
| 2003/0205184 | A1 | 11/2003 | Ramme et al. |

FOREIGN PATENT DOCUMENTS

| DE | 37 11 503 A1 | 10/1988 |
| DE | 38 15 963 A1 | 11/1989 |
| SE | 514 547      | 3/2001  |
| WO | WO 01/23317 A1 | 4/2001 |
| WO | WO 01/66486 A1 | 9/2001 |

*Primary Examiner*—Paul Marcantoni
(74) *Attorney, Agent, or Firm*—Fish & Richardson P.C.

(57) ABSTRACT

A method of treating fly ash and fly ash treated thereby, the method involving contacting ammonia-laden fly ash with an organic base-containing treatment composition, where the organic base causes the ammonia within the fly ash to evolve from the fly ash. The treatment composition preferably includes an effective amount of one or more amines. The treatment compound may be applied to the fly ash in any manner effective to disperse the treatment compound among the fly ash.

22 Claims, 4 Drawing Sheets

Residual ammonia in No 4 fly ash sample treated with 1 wt% of various amines, illustrated as function of mixing time up to 15 minutes, and after 24 hours standing

METHOD OF REMOVING AMMONIA FROM FLY ASH AND FLY ASH COMPOSITION PRODUCED THEREBY

BACKGROUND OF THE INVENTION

The invention is generally related to a method for removing ammonia from fly ash. Particularly, the invention provides for the addition of a treating compound to an ammonia-laden fly ash material that causes the evolution and removal of ammonia from the fly ash.

Fly ash is a fine, powdered glassy material recovered from the gases of burning coal during the production of electricity. The micron-sized fly ash particles consist primarily of silica, alumina, and iron, and may contain various other oxides and residual carbon. Fly ash has a number of uses as an additive for different materials. For instance, when mixed with lime and water the fly ash forms a cementitious composition with properties very similar to that of Portland cement and can be used to replace a portion of the cement in concrete. Also, because fly ash consists of very small particulates, the ash may advantageously be used as a filler in plastics.

Fly ash produced from burning coal often contains significant levels of ammonia. The ammonia content results from contacting ammonia vapor with fly ash to minimize the $NO_x$ output of coal burning plants. Ammonia is also utilized to reduce $SO_3$ emissions which can produce a "blue plume" effect causing noncompliance of opacity limits. In another application, ammonia or occasionally urea is injected into the flue stream and deposits onto fly ash as ammonium salts that modify the fly ash's resistivity and enhance electrostatic precipitator performance. In all of these examples, typically some portion of the vapor phase ammonia adsorbs or deposits on the fly ash as ammonia or an ammonium salt.

The presence of ammonia within the fly ash causes problems in the storing, handling, and disposal of the fly ash itself. The presence of ammonia is particularly problematic in situations where the fly ash is in contact with water where the ammonia can runoff or leach into the ground. The presence of ammonia also causes particular problems with odor when using the fly ash as an additive in cement mixtures or concrete applications. The high pH environment inherent to cementitious mixtures causes the ammonium salt to under go an acid/base reaction with the accompanying release of ammonia vapor. The ammonia vapor produces a pungent odor that, if excessively high in concentration, represents a potential health issue. The issue occurs primarily during the placement and finishing of concrete, cementitious grouts, or flowable fill containing fly ash contaminated with high concentrations of ammonia. The issue may continue even after the concrete has cured and hardened.

Industry experience has generally established that fly ash containing less than 100 mg ammonia per kilogram of ash (100 parts per million (ppm)) produces little or no odor when used in the production of concrete. However, the addition of ammonia at the power generation plant may results in fly ash ammonia contents of 200 to 2500 ppm, rendering the fly ash unacceptable for use in concrete. Removal of ammonia from fly ash such that the fly ash can be used in concrete would reduce the need for solid waste disposal. It would also benefit the concrete producer by lowering the cost of materials and increasing product quality. Partial substitution of Portland cement with fly ash benefits the environment by reducing the emission of greenhouse gases associated with the production of cement. Removal of ammonia from fly ash may also be desirable for fly ash to be disposed in a landfill or via other disposal methods, and may be required by environmental or other local rules.

Several methods have been proposed and used in the past to remove ammonia from fly ash. Perhaps the most common method is by contacting the ammonia-laden fly ash with water. For example, U.S. Pat. No. 6,077,494 describes a method of reducing ammonia values in ammonia-laden fly ash by contacting the fly ash with water. The evolution of ammonia will generally be enhanced by contacting the fly ash with small amount of alkali such as quicklime (CaO), hydrated lime ($Ca(OH)_2$), sodium hydroxide (NaOH), fluid bed residue, and solutions, slurries, and combinations thereof, along with the water. In practice, it has been found that for low alkalinity fly ash, the alkali source is required when using water for ammonia removal. The fly ash is exposed to a mist or fog of water and is agitated to cause evolution of ammonia. The primary disadvantage to this method of ammonia removal is that after wetting, the fly ash must either be maintained in a wet condition until mixed as cement, or it must be dried by using expensive and energy intensive equipment. In addition, in practice, dosages of the alkali sources referenced above need to be controlled accurately because the presence of excess quantities of free lime in the processed fly ash changes the behavior of the fly ash in concrete, decreasing its usefulness.

Other treatment options involve heating the ash and driving off the ammonia by heat. Exemplary heat treatment methods are discussed in U.S. Pat. No. 6,755,901 and U.S. Patent Publication No. 2003/0205184. The heat treatment options allow the removal of ammonia without the need to add additional chemicals to the fly ash. However, the energy needed to reach and maintain elevated ash temperatures, such as 900° F., and the process equipment required to flush the ammonia gas from the mass of the ash, separate the ash from the ammonia gas, and cool the ash, make this an expensive option.

It is desired to provide an improved method for reducing ammonia content in ammonia-laden fly ash without the limitations or drawbacks associated with previous methods of ammonia reduction, namely high energy costs associated with heating or drying. It is further desired to provide a fly ash material having reduced ammonia content such that expense associated with treatment of a cement admixture to neutralize ammonia is not necessary.

BRIEF SUMMARY OF THE INVENTION

The invented treatment method effectively reduces the ammonia content of ammonia-laden fly ash by contacting ammonia or an ammonium salt with a treatment composition comprising one or more amines. The treatment method is effective at relatively low temperatures and does not require the use of water as required in prior art compositions.

The method of the invention involves contacting a batch or continuous supply of ammonia-laden fly ash with a treatment composition including one or more organic bases preferably having a $pK_b$ less than 4.75 thereby causing the ammonia to be evolved from the fly ash. The treatment composition preferably includes an effective amount of one or more amine compounds. More preferably, the treatment composition includes an effective amount of one or more amines including cycloamines, diamines, polyamines, and compounds represented generally by formula (I)

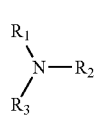

(I)

where $R_1$ and $R_2$ are independently selected from hydrogen, $C_1$-$C_8$ alkyl, $C_1$-$C_4$ hydroxyalkyl, aryl, and hydroxyaryl, wherein the alkyl, hydroxyalkyl, aryl and hydroxyaryl groups may be substituted or unsubstituted and branched or unbranched, and $R_3$ is selected from $C_1$-$C_{18}$ alkyl, $C_1$-$C_4$ hydroxyalkyl (including alkoxylated hydroxyalkyl), aryl, hydroxyaryl, and $C_2$-$C_4$ alkenyl, wherein the alkyl, hydroxyaryl, aryl, hydroxyaryl and alkenyl groups may be substituted or unsubstituted and branched or unbranched.

The treatment composition may be applied to the fly ash in any manner effective to disperse the treatment composition among the fly ash, advantageously including a liquid spray or a vapor. The liquid spray is preferably atomized. Once the treatment composition is applied to the fly ash, the mixture is advantageously agitated in order to facilitate commingling and intimate contact of the ammonia or ammonium salt with the treatment composition.

The treatment composition reacts with the ammonium salt by an acid-base reaction to convert ammonium salts to gaseous ammonia. In contrast to reactions involving inorganic bases such as oxides and hydroxides, the reaction involving organic bases does not require any water, and therefore does not require any water removal step. In the reaction with a treatment composition including one or more amine compounds, the amine can displace the ammonia by substitution of the ammonia in the ammonium salt. The gaseous ammonia is evolved and eliminated from the fly ash composition. The organic base which has displaced the ammonia from an ammonium salt will remain in the ash in the form of a salt, for example, an amine salt. Any amount of organic base added in excess will remain as a free base. The treatment composition may also act to displace ammonia that is physically adsorbed to the surface of the fly ash. Advantageously, air flow, vacuum, or another mass transport technique is used with agitation to remove the ammonia gas evolved from the fly ash, although agitation can be used alone.

Heat is advantageously applied to the fly ash during treatment. The heat may accelerate reaction of the treatment composition with the ammonium salts and may also cause direct evolution of ammonia and ammonium salts from the fly ash.

The treatment composition may comprise water or a solvent used as an extender or carrier to aid in providing good contact of the organic base with the surface of the fly ash. For high alkalinity fly ash compositions, water may advantageously augment the reaction of the organic base. For low alkalinity fly ash compositions, alkaline salts, such as sodium carbonate (soda ash), sodium aluminate, sodium silicate, or the like, may also enhance the effectiveness of the organic base.

According to one embodiment, the method is a continuous process that includes causing a body of ammonia-laden fly ash to flow in a stream, such as by freefall or pneumatic conveyor, and applying the amine treatment composition to the fly ash. In accordance with this embodiment, the amount of treatment composition applied to the fly ash can be based on the flow rate of the fly ash. As a result, the treatment composition can be dispersed within the fly ash in an effective amount to reduce the ammonia content without waste of excess treatment composition. The treatment composition can also be pressurized and applied to the fly ash. The ammonia content may be reduced to a level below a predetermined value or may simply be reduced, in general. This embodiment may be executed manually, mechanically, or electronically, such as by providing the measured flow rate of the fly ash to a controller, pressurizing the treatment composition with a pressurizing apparatus in operative communication with the controller, and dispersing the pressurized treatment composition into the stream of fly ash.

According to another embodiment, additional treating agents may be applied to the fly ash, either as part of the treatment composition or at separate points in the fly ash conditioning process. Examples of additional treating agents may include sacrificial agents, surfactants, dispersants, chemical activators, coating compositions, and combinations thereof. If the additional treating agents are applied to a flowing stream of fly ash, the treating agents may be applied at rates and in amounts corresponding to the determined flow rate of the fly ash.

According to another embodiment, when an amine has been used as the organic base, the resultant treated fly ash composition consists essentially of the fly ash and at least a residual amount of the organic base. The treated fly ash composition also preferably includes less than 150 ppm ammonia, more preferably less than 100 ppm, and even more preferably less than 50 ppm. The treated fly ash composition preferably includes less than 2.0 wt % water, more preferably less than 1.5 wt % water, and even less than 1.0 wt %, since higher amounts of water in the fly ash cause the ash to become unmanageable and handling becomes difficult. In some embodiments, the treated fly ash composition is substantially free of water (less than 0.1 wt %) or includes no water at all. As a result, the treated fly ash may be easily dried without the need for the substantial capital or energy requirements needed in previous wet systems.

The fly ash composition is treated before it is used for other applications, e.g., cementitious compositions, and, once treated, can be mixed with other components to produce hydraulic cement (e.g. Portland cement) and the like. Thus, the treated fly ash may be stored, transported, or further processed prior to use in cement or in other applications.

According to another embodiment, the treated fly ash is used in the production of cementitious material having low ammonia content, such as by mixing the treated fly ash with hydraulic cement to form a cementitious material. The cementitious material may be mixed with an aggregate material, such as sand or gravel, to form concrete. Concrete made in accordance with this embodiment exhibits little or no ammonia odor due to the reduction in ammonia of the fly ash.

In accordance with an embodiment of the invention, the present method preferably does not use added water in the removal of ammonia, therefore avoiding the lengthy drying times and expensive drying requirements required to dry fly ash treated according to previous methods. Accordingly, any water that may be present in the resulting treated fly ash composition is preferably the result of water present in the fly ash itself prior to treatment.

BRIEF DESCRIPTION OF THE SEVERAL VIEWS OF THE DRAWINGS

Figure 1:
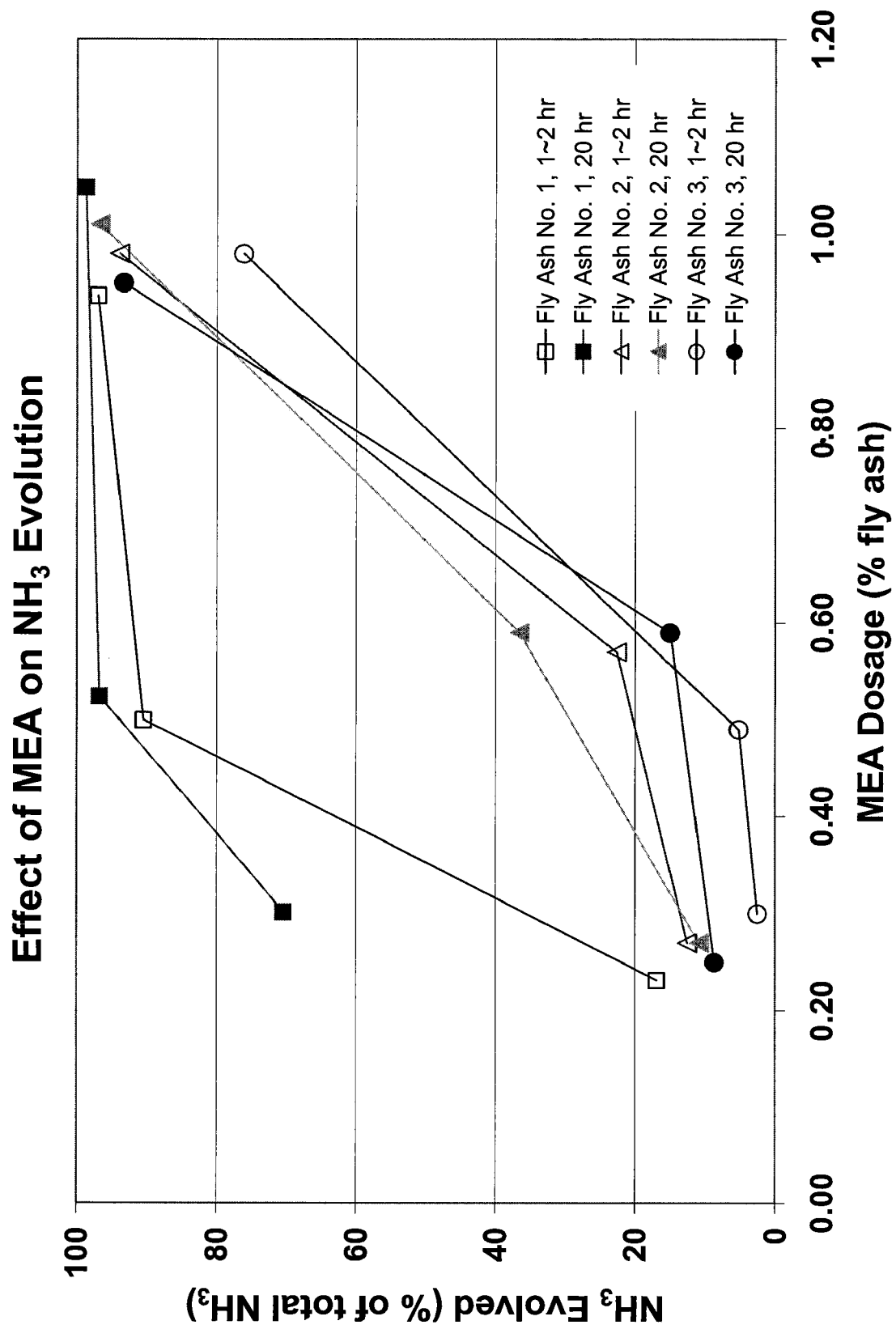
Figure 2:
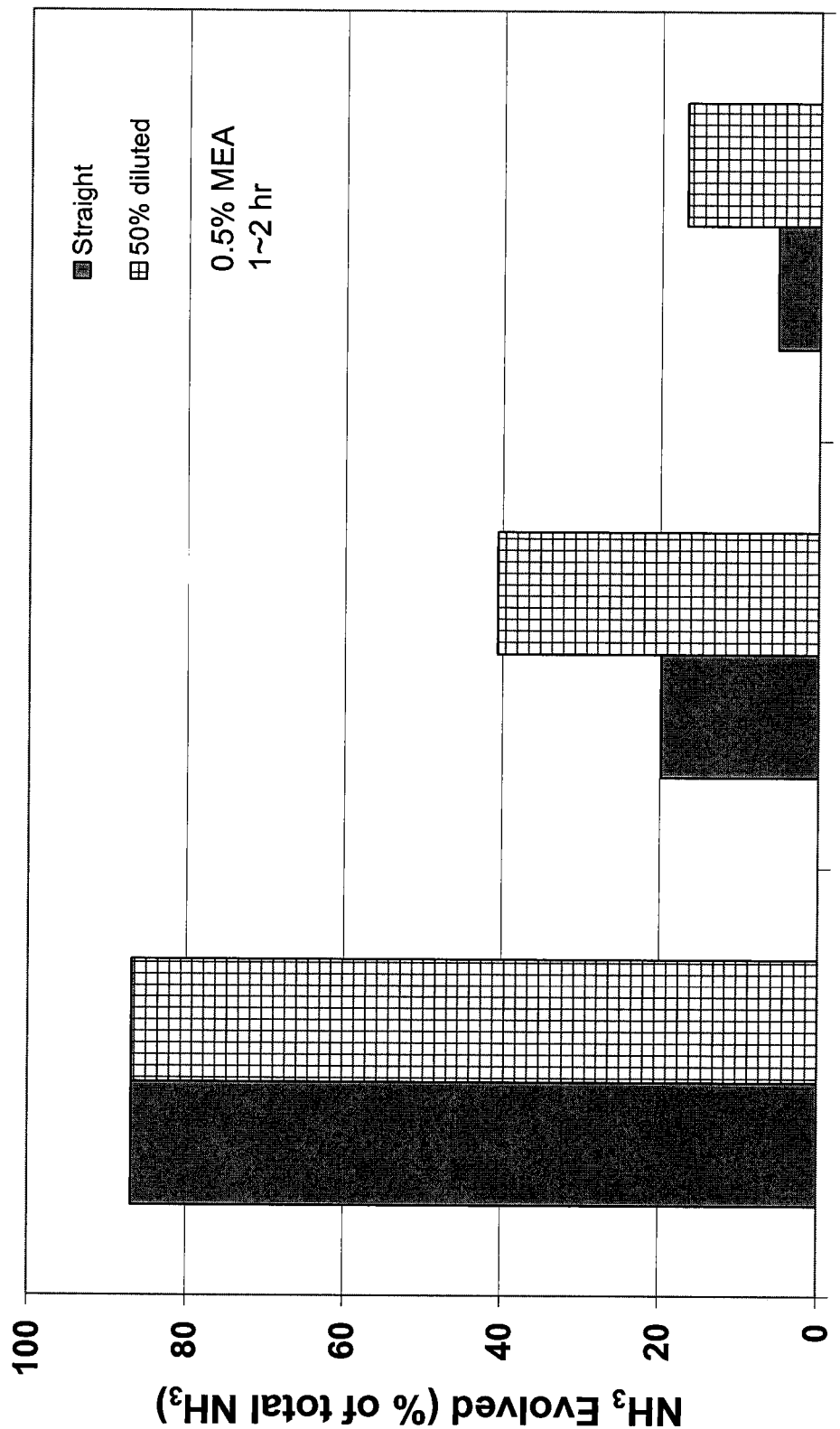

Having thus described the invention in general terms, reference will now be made to the accompanying drawings, which are not necessarily drawn to scale, and wherein:

FIG. 1 is a graph showing monoethanol amine weight percentage added to fly ash versus percentage of ammonia evolved from fly ash in accordance with an embodiment of the invention;

FIG. 2 is a chart showing the effect of dilution with water upon a monoethanol amine treatment composition added to fly ash in accordance with another embodiment of the invention.

Figure 3:
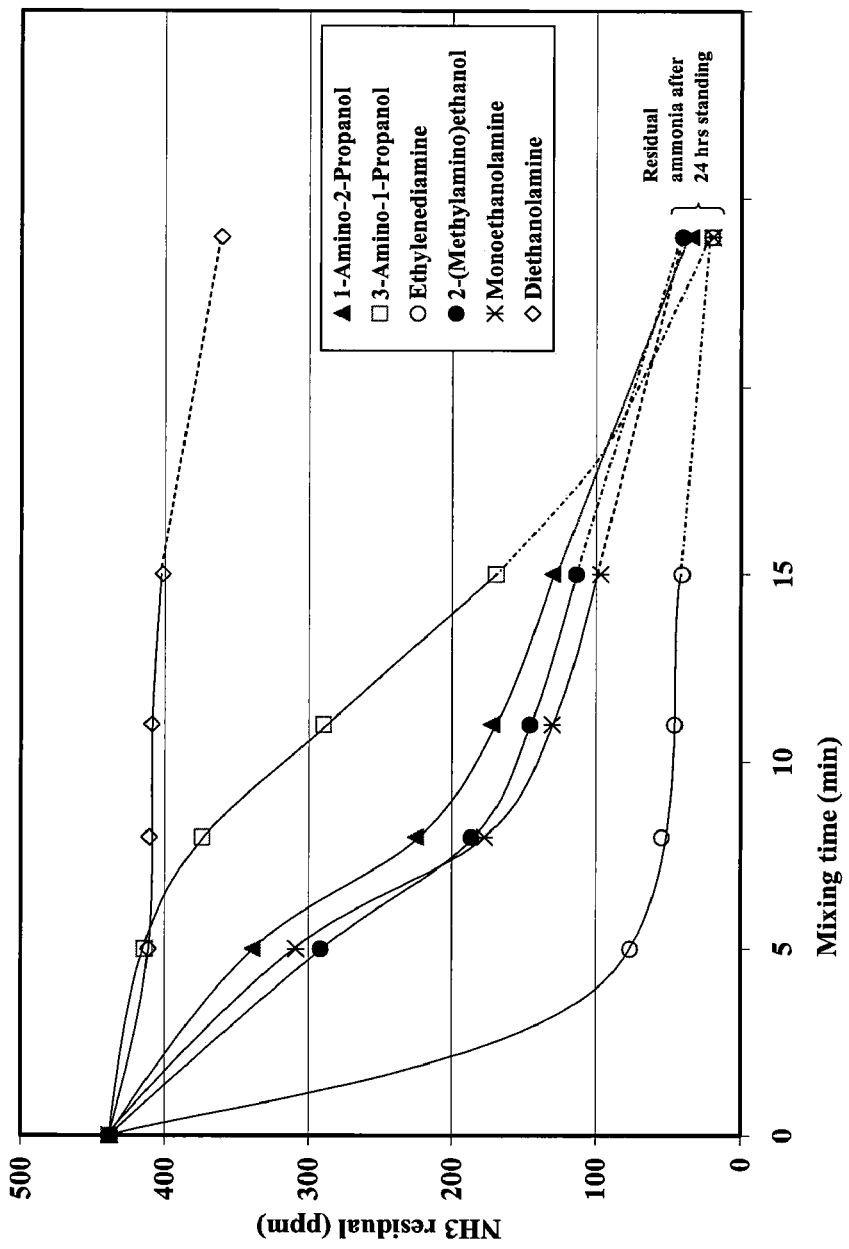
Figure 4:
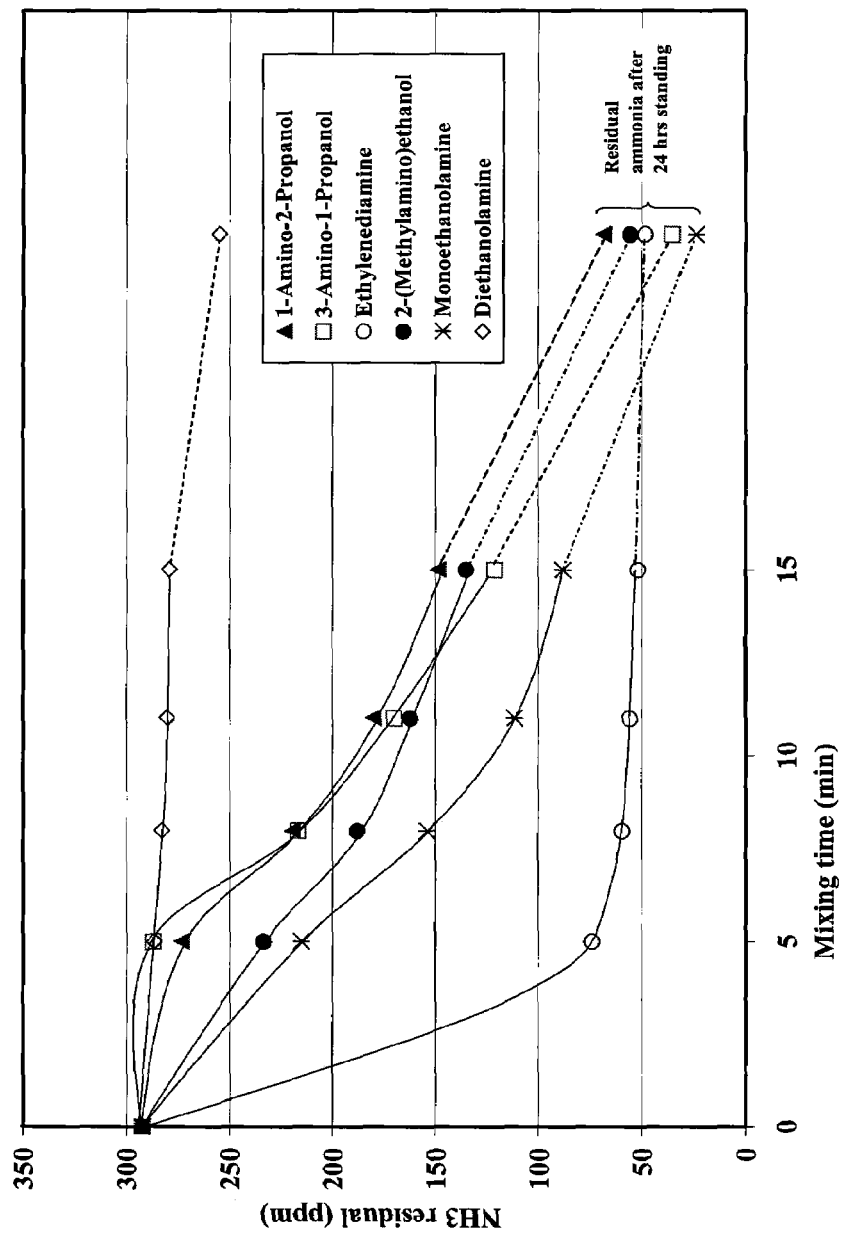

FIG. 3 is a graph showing the residual ammonia in a fly ash sample treated with various amine treatment compositions as a function of time in accordance with the invention; and FIG. 4 is a graph showing the residual ammonia in another fly ash sample treated with various amine treatment compositions as a function of time in accordance with the invention.

DETAILED DESCRIPTION OF THE INVENTION

The present invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. The term "comprising" and variations thereof as used herein is used synonymously with the term "including" and variations thereof and are open, non-limiting terms.

As used herein, "fly ash" is any fine ash product produced by combustion of coal, particularly powdered coal. The fly ash is a mixture of alumina, silica, unburned carbon, and various metallic oxides, which may include oxides of iron, calcium, magnesium, potassium, sodium, sulfur, and titanium. The fly ash may contain unburned carbon content (LOI) from 0.1 wt % to 10.0 wt %.

As used herein, "treatment composition" includes one or more compounds, solutions, or mixtures that may be mixed with the fly ash for purposes of reducing the ammonia content of the fly ash. The treatment composition contains at least an effective amount of one or more organic bases. The organic base is any organic base suitable for reaction with ammonium salts. Such bases are generally those organic bases having a $pK_b$ less than about 4.75. The one or more organic bases preferably include an amine compound as described herein.

The organic base may be a neat liquid or applied in a carrier solvent. The carrier solvent may be a low molecular weight organic solvent, such as a low molecular weight alcohol or glycol, or may be water. The total applied dosage of organic base and carrier solvent should not exceed about 3 wt % by weight of the fly ash, and is preferably less than 2 wt %. The carrier solvent can also be a chemical admixture introduced in the treatment composition including another component such as a sacrificial agent for reducing the carbon activity of fly ash. The use of water as a carrier solvent may enhance the effectiveness of the treatment composition on highly alkaline fly ash, e.g., those ashes that produce an aqueous slurry with a pH value above about 9.

The treatment composition may also include supplemental additives, such as sacrificial agents, surfactants, dispersants, chemical activators, coating compounds, or combinations thereof. Suitable additives would be readily determined by those skilled in the art. For example, U.S. patent application Ser. No. 10/762,762, filed Jan. 22, 2004, describes suitable sacrificial agents, the disclosure of which is incorporated herein in its entirety by reference to the extent it does not conflict with the instant disclosure. These additives can be added with the organic base as part of a single treatment composition or the additives may be added separately. These additives can also be used as a carrier for the organic base.

The preferred amine compounds for use in the invention are selected from cycloamines, diamines, polyamines, and compounds represented by formula (I)

(I)

where $R_1$ and $R_2$ are independently selected from hydrogen, $C_1$-$C_8$ alkyl, $C_1$-$C_4$ hydroxyalkyl, aryl, and hydroxyaryl, wherein the alkyl, hydroxyalkyl, aryl and hydroxyaryl groups may be substituted or unsubstituted and branched or unbranched, and $R_3$ is selected from $C_1$-$C_{18}$ alkyl, $C_1$-$C_4$ hydroxyalkyl (including alkoxylated hydroxyalkyl), aryl, hydroxyaryl, and $C_2$-$C_4$ alkenyl, wherein the alkyl, hydroxyaryl, aryl, hydroxyaryl and alkenyl groups may be substituted or unsubstituted and branched or unbranched.

Preferred compounds represented by formula (I) include those wherein $R_1$ is selected from hydrogen and $C_1$-$C_8$ alkyl wherein the alkyl groups may be substituted or unsubstituted and branched or unbranched; $R_2$ is selected from hydrogen, $C_1$-$C_8$ alkyl and $C_1$-$C_4$ hydroxyalkyl, wherein the alkyl and hydroxyalkyl groups may be substituted or unsubstituted and branched or unbranched, and $R_3$ is selected from $C_1$-$C_{18}$ alkyl, $C_1$-$C_4$ hydroxyalkyl (which may be alkoxylated with 1-3 oxyalkylene groups), aryl, and $C_2$-$C_4$ alkenyl, wherein the alkyl, hydroxylalkyl, aryl and alkenyl groups may be substituted or unsubstituted and branched or unbranched.

Preferred diamines and polyamines include ethylenediamine, hexamethylenediamine, and diethylenetriamine. Preferred amines represented by formula (I) include n-butylamine, tert-butylamine, sec-butylamine, isobutylamine, decylamine, dibutylamine, diisobutylamine, diisopropylamine, diethylamine, dimethylamine, dodecylamine, ethylamine, methylamine, octadecylamine, n-ocylamine, propylamine, isopropylamine, tetradecylamine, tributylamine, triethylamine, trimethylamine, tri-n-octylamine, tripropylamine, tetraethylene pentamine, benzylamine, 1-amino-2-propanol, 2-amino-2-methyl-1-propanol, 3-amino-1-propanol, diethanolamine, n-n-dimethylethanolamine, ethanolamine, and 2-(methylamino)-ethanol. More preferred amines include amines represented by formula (I) wherein $R_1$ is hydrogen, $R_2$ is $C_1$-$C_4$ alkyl, and $R_3$ is $C_1$-$C_4$ hydroxyalkyl, for example, 2-(methylamino)-ethanol.

Particularly preferred amines for use in the invention include ethylenediamine, diethylenetriamine, 2-(2-aminoethoxy)ethanol, and monoalkanol amines such as monoethanol amine, 1-amino-2-propanol, 2-amino-2-methyl-1-propanol, and 3-amino-1-propanol.

In one preferred embodiment, the treatment composition includes one or more amine compounds with $pK_b$ of less than about 4.75 selected from the group consisting of cycloamines, diamines, polyamines, and compounds represented by formula (I). In another embodiment, the treatment compound includes two or more amine compounds each with a $pK_b$ of less than about 4.75 and each selected from the group consisting of cycloamines, diamines, polyamines, and compounds represented by formula (I).

In another embodiment, the treatment composition includes at least one amine compound with a $pK_b$ of less than about 4.75 selected from the group consisting of cycloamines, diamines, polyamines, and compounds represented by formula (I), and at least one amine compound selected from the group consisting of cycloamines, diamines, polyamines, and compounds represented by formula (I) with a $pK_b$ of greater than 4.75. In this embodiment, a sufficient amount of the at least one amine compound with a $pK_b$ of less than about 4.75 is included to produce the reduction in ammonia content.

The organic base treatment composition is applied to a batch or continuous supply of ammonia-laden fly ash. The ammonia content of the ammonia-laden fly ash may be present as free ammonia physically bound to the surface of the fly ash or as one or more ammonium salts.

As an example of application to a batch of fly ash, a continuous stream of air containing atomized or vaporized treating composition is passed through a fixed bed of ash in an upflow configuration. Dispersion of the treatment composition may be accomplished through known methods of dispersing liquid compositions, such as through a throttling valve or by use of an ultrasonic nebulizer. The upward flow of air through the fly ash causes agitation of the fly ash and allows for dispersion of the treating composition among the fly ash. The air stream is advantageously heated, such as up to 150° F., but need not be heated. Also, the air stream advantageously has a relatively low relative humidity that does not add to the water content of the fly ash.

An exemplary method for treating continuous or semi-continuous streams of fly ash in accordance with the invention is reflected in U.S. patent application Ser. No. 10/430,744, filed May 6, 2003, the disclosure of which is incorporated herein in its entirety by reference to the extent it does not conflict with the instant disclosure. The disclosed method generally comprises a manner of combining fly ash and a liquid such that the liquid is well dispersed within the fly ash and available to react with the fly ash. The method accomplishes this combination by evenly dispersing a treating fluid into a flowing stream of fly ash. By dispersing the treating fluid into the fly ash as the fly ash is flowing, the method takes advantage of natural mixing and particle motion that occurs during flow of the bulk solid. Further, when the fly ash freely flows, either by gravitational free fall or pneumatic conveyance, the fly ash exhibits flow characteristics of a fluid. Treatment of the fly ash when fluidized further improves the mixing and interaction of the treating fluid with the ash. Application of the treatment composition may be automated by use of an electronic controller.

In either batch or continuous treatment methods, it is advantageous to apply the organic base to the fly ash in an amount that corresponds to the ammonia content of the fly ash being treated, although other factors related to the composition of the fly ash, including the alkalinity of the fly ash, may affect the preferred amount applied. Approximate ammonia content may be determined by calculating batch volumes or continuous flow rates of fly ash having known or estimated ammonia content. Of course, determination of ammonia content of the fly ash may be needed if not previously known. Efficacy of particular organic bases may be determined by experimentation or otherwise and application of treatment composition may be calculated so that the treatment composition is applied in an effective amount without waste of the composition.

The amount of amine that is applied to the fly ash is from about 0.1 wt % to about 2.0 wt %, and more preferably from about 0.2 wt % to about 1.0 wt % by weight of the fly ash. Typically, the amount of ammonia present in the untreated fly ash is between about 50 and 1500 ppm. Preferably, treatment with the amine treatment composition produces a fly ash having at least a 70 wt % reduction in the ammonia content, more preferably an 80 wt %, a 90 wt % or even a 95 wt % reduction in the ammonia content as compared to the untreated fly ash. Ammonia content of less than 150 ppm is often undetectable by an end user. Therefore, treatment may advantageously be carried out until ammonia content is reduced to less than 150 ppm and more preferably less than 100 ppm.

The method results in a unique fly ash composition having residual treatment composition content. After being allowed to react with the treatment composition for a suitable time at a suitable temperature, the fly ash composition typically contains ammonia in an amount of less than 150 ppm, each per total weight of the fly ash composition. The treated fly ash composition does not contain hydraulic cement, such as Portland cement, but can be later combined with hydraulic cement to produce a cementitious composition.

As previously noted, in the reaction with a treatment composition including one or more amine compounds, the amine can displace the ammonia by substitution of the ammonia in the ammonium salt present in the fly ash. The organic base which has displaced the ammonia from an ammonium salt will remain in the ash in the form of an amine salt; any amount of the organic base added in excess will remain as a free base. Following treatment of the fly ash, the one or more organic bases may be present in the fly ash in the form of one or more free bases or amine salts. Some portion of the organic base may also volatilize during or following treatment with the treatment composition.

EXAMPLES

Example 1

Treatment of Ammonia-Laden Fly Ash with Monoethanol Amine

Fly ash (FA) samples were collected from three coal burning plants. These samples are generally representative of fly ash available from various coal burning plants across the U.S. Each of the three samples was mixed in an aqueous slurry with 1% by mass fly ash and tested to determine the pH and initial ammonia content of the samples. As indicated in Table 2 below, sample 1 had an initial pH of 11.6 and ammonia content of about 256 ppm, sample 2 had an initial pH of 12.4 and ammonia content of about 489 ppm, and sample 3 had an initial pH of 4.3 and ammonia content of about 66 ppm.

Each of the samples was divided into 6 subsamples. Each subsample was treated with a treating composition containing monoethanol amine (MEA) in the amounts shown in the table and treated for the elapsed time as indicated in the table. For each sample, the first four of the 6 subsamples were treated between 1 and 2 hours, and the remaining three of the 6 subsamples were treated for about 20 hours. Afterward, the ammonia content of each subsample was again measured and the amount and percentage of ammonia evolved from the subsamples was determined. The results are shown in Table 1.

FIG. 1 shows a graph of MEA as a weight percentage of the fly ash versus the percent evolution of ammonia from the fly ash sample. As shown in the graph, there is a significant increase in ammonia evolution at MEA percentages from about 0.4 wt % to about 1.0 wt %, depending on the particular fly ash sample. All but one of the samples exhibited greater than a 90% reduction in ammonia when treated with MEA approximating 1 wt %.

TABLE 1

| Sample ID | pH of FA | Water Content (wt % of FA) | MEA Content (wt % of FA) | Elapsed Time (hrs) | Agitation | residual [NH$_3$] (ppm in treated FA) | [NH$_3$] Evolved (ppm from FA) | % NH$_3$ Evolved |
|---|---|---|---|---|---|---|---|---|
| 1 | 11.6 | 0.0 | 0.23 | 1~2 | stirred every 15 min. | 213.5 | 43.3 | 16.9 |
| 1 | 11.6 | 0.0 | 0.52 | 1~2 | stirred every 15 min. | 24.6 | 232.2 | 90.4 |
| 1 | 11.6 | 0.0 | 0.94 | 1~2 | stirred every 15 min. | 7.8 | 248.9 | 96.9 |
| 1 | 11.6 | 0.0 | 0.30 | 20 | stirred every 15 min. for the 1st hr. | 76.0 | 180.8 | 70.4 |
| 1 | 11.6 | 0.0 | 0.52 | 20 | stirred every 15 min. for the 1st hr. | 8.4 | 248.3 | 96.7 |
| 1 | 11.6 | 0.0 | 1.05 | 20 | stirred every 15 min. for the 1st hr. | 3.4 | 253.4 | 98.7 |
| 2 | 12.4 | 0.0 | 0.27 | 1~2 | stirred every 15 min. | 428.4 | 61.5 | 12.6 |
| 2 | 12.4 | 0.0 | 0.57 | 1~2 | stirred every 15 min. | 379.1 | 110.8 | 22.6 |
| 2 | 12.4 | 0.0 | 0.98 | 1~2 | stirred every 15 min. | 30.0 | 459.9 | 93.9 |
| 2 | 12.4 | 0.0 | 0.27 | 20 | stirred every 15 min. for the 1st hr. | 436.6 | 53.3 | 10.9 |
| 2 | 12.4 | 0.0 | 0.59 | 20 | stirred every 15 min. for the 1st hr. | 310.8 | 179.1 | 36.6 |
| 2 | 12.4 | 0.0 | 1.01 | 20 | stirred every 15 min. for the 1st hr. | 16.6 | 473.3 | 96.6 |
| 3 | 4.3 | 0.0 | 0.30 | 1~2 | stirred every 15 min. | 65.0 | 1.7 | 2.5 |
| 3 | 4.3 | 0.0 | 0.49 | 1~2 | stirred every 15 min. | 63.2 | 3.5 | 5.2 |
| 3 | 4.3 | 0.0 | 0.98 | 1~2 | stirred every 15 min. | 15.9 | 50.8 | 76.2 |
| 3 | 4.3 | 0.0 | 0.25 | 20 | stirred every 15 min. for the 1st hr. | 60.9 | 5.8 | 8.7 |
| 3 | 4.3 | 0.0 | 0.59 | 20 | stirred every 15 min. for the 1st hr. | 56.7 | 10.0 | 15.0 |
| 3 | 4.3 | 0.0 | 0.95 | 20 | stirred every 15 min. for the 1st hr. | 4.5 | 62.2 | 93.3 |

Example 2

Effect of Dilution of MEA

As shown in Table 2 and reflected in the graph of FIG. 2, two untreated portions were selected from each of the three samples. For each sample, the first of the two portions was treated with a wt % of MEA and the second portion was treated with a like amount of MEA in addition to an equal amount of water. The effectiveness of the alcohol amine is shown to be unchanged by the dilution with water in one sample and to substantially improve the effectiveness in two other samples. This shows that a minimal amount of water may be used to effectively disperse the base and provide increased contact with the fly ash. The moisture content is controlled so as not to require supplemental drying after treatment.

TABLE 2

| Sample ID | Water Content (wt % of FA) | MEA Content (wt % of FA) | Elapsed Time (hrs) | Agitation | residual [NH$_3$] (ppm in FA) | [NH$_3$] Evolved (ppm in FA) | % NH$_3$ Evolved |
|---|---|---|---|---|---|---|---|
| 1 | 0.0 | 0.52 | 1~2 | stirred every 15 min. | 24.6 | 232.2 | 90.4 |
| 1 | 0.50 | 0.50 | 1~2 | stirred every 15 min. | 33.7 | 223.1 | 86.9 |

TABLE 2-continued

| Sample ID | Water Content (wt % of FA) | MEA Content (wt % of FA) | Elapsed Time (hrs) | Agitation | residual [NH$_3$] (ppm in FA) | [NH$_3$] Evolved (ppm in FA) | % NH$_3$ Evolved |
|---|---|---|---|---|---|---|---|
| 2 | 0.0 | 0.57 | 1~2 | stirred every 15 min. | 379.1 | 110.8 | 22.6 |
| 2 | 0.53 | 0.53 | 1~2 | stirred every 15 min. | 279.3 | 210.6 | 43.0 |
| 3 | 0.0 | 0.49 | 1~2 | stirred every 15 min. | 63.2 | 3.5 | 5.2 |
| 3 | 0.52 | 0.52 | 1~2 | stirred every 15 min. | 55.0 | 11.7 | 17.5 |

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Example 3

Treatment with Various Organic Bases

Two fly ash bulk samples were collected to test different alternative organic bases; the first, designated Sample No. 4, had a pH of 12.2 (in 10 wt % aqueous slurry) and contained 430 ppm ammonia; the second, designated Sample No 5, had a slurry pH of 10.4 and an ammonia content of 292 ppm. From these bulk samples, 300-gram subsamples were taken and treated with various organic bases at 1.0 wt % dosages, in the absence of water; these organic bases include:

Monoethanolamine,
Diethanolamine,
Ethylenediamine,
3-Amino-1-Propanol,
1-Amino-2-Propanol, and
2-(Methylamino)-Ethanol A 300-gram fly ash subsample was placed in a Hobart-type mixer and, while stirring the fly ash material, the liquid organic base was injected slowly onto the solids over a period of 30 seconds; 50-gram portions of the treated fly ash were removed at 5, 8, 11 and 15 minutes for residual ammonia analysis. Mixing was stopped at 15 minutes and the remaining treated fly ash was transferred to an open jar to allow escape of the ammonia gas. The residual ammonia in the treated fly ash was measured after 24 hours standing time.

The results of these tests are illustrated in FIG. 3 for fly ash Sample No. 4, and in FIG. 4 for fly ash Sample No. 5. The results again demonstrate that the organic bases selected are capable of displacing the ammonia from the fly ash, in the absence of any water. At a dosage of 1 wt % and a contact time of 24 hours, all the amines tested, except diethanolamine, reduced the level residual ammonia to a level well below 100 ppm. Although not wishing to be bound by theory, diethanolamine appears to be only marginally effective because its pK$_b$ is 5.04, which is close to the pK$_b$ of ammonia.

That which is claimed:

1. A process for the production of cementitious material comprising the steps of
supplying an ammonia-laden fly ash;
supplying a treatment composition comprising one or more organic bases;
contacting the ammonia-laden fly ash with the treatment composition to produce a treated fly ash having an ammonia content of less than about 150 ppm per total weight of the treated fly ash; and
mixing the treated fly ash with a hydraulic cement.

2. The process of claim 1, further comprising mixture of the formed cementitious material with an aggregate material to form concrete.

3. The process of claim 1, further comprising the step of agitating the fly ash and the treatment composition prior to mixing the treated fly ash and the hydraulic cement.

4. The process of claim 1, further comprising the step of heating the fly ash and the treatment composition prior to mixing the treated fly ash and the hydraulic cement.

5. The process of claim 1, wherein the treatment composition is a non-aqueous composition.

6. The process of claim 1, wherein the one or more organic bases have a pK$_b$ value of less than 4.75.

7. The process of claim 1, wherein the treatment composition comprises one or more amines.

8. The process of claim 7, wherein the one or more amines are selected from the group consisting of amines with a pK$_b$ value of less than 4.75.

9. The process of claim 7, wherein the one or more amines include one or more amines selected from the group consisting of cycloamines, diamines, polyamines, and compounds represented by formula (I)

where R$_1$ and R$_2$ are independently selected from hydrogen, C$_1$-C$_8$ alkyl, C$_1$-C$_4$ hydroxyalkyl, aryl, and hydroxyaryl, wherein the alkyl, hydroxyalkyl, aryl and hydroxyaryl groups may be substituted or unsubstituted and branched or unbranched, and R$_3$ is selected from C$_1$-C$_{18}$ alkyl, C$_1$-C$_4$ hydroxyalkyl (including alkoxylated hydroxyalkyl), aryl, hydroxyaryl, and C$_2$-C$_4$ alkenyl, wherein the alkyl, hydroxyaryl, aryl, hydroxyaryl and alkenyl groups may be substituted or unsubstituted and branched or unbranched.

10. The process of claim 9, wherein the one or more amines includes one or more amines selected from the group consisting of compounds represented by formula (I)

wherein $R_1$ is selected from hydrogen and $C_1$-$C_8$ alkyl wherein the alkyl groups may be substituted or unsubstituted and branched or unbranched; $R_2$ is selected from hydrogen, $C_1$-$C_8$ alkyl and $C_1$-$C_4$ hydroxyalkyl, wherein the alkyl and hydroxyalkyl groups may be substituted or unsubstituted and branched or unbranched, and $R_3$ is selected from $C_1$-$C_{18}$ alkyl, $C_1$-$C_4$ hydroxyalkyl (which may be alkoxylated with 1-3 oxyalkylene groups), aryl, and $C_2$-$C_4$ alkenyl, wherein the alkyl, hydroxylalkyl, aryl and alkenyl groups may be substituted or unsubstituted and branched or unbranched.

11. The process of claim 9, wherein the one or more amines are selected from the group consisting of monoethanol amine, diethanol amine, triethanol amine, 1-amino-2-propanol, 2-amino-2-methyl-1-propanol, 3-amino-1-propanol, 2-(methylamino)-ethanol, 2-(2-aminoethyoxy)ethanol, ethylenediamine, and diethyenetriaminee.

12. The process of claim 9, wherein the one or more amines selected from the group consisting of cycloamines, diamines, polyamines, and amines represented by formula (I) includes one or more amines with a $pK_b$ value of less than 4.75.

13. The process of claim 9, wherein the one or more amines selected from the group consisting of cycloamines, diamines, polyamines, and amines represented by formula (I) includes two or more amines with a $pK_b$ value of less than 4.75.

14. The process of claim 9, wherein the one or more amines selected from the group consisting of cycloamines, diamines, polyamines, and amines represented by formula (I) includes one or more amines with a $pK_b$ value of less than 4.75 and one or more amines with a $pK_b$ value of more than 4.75.

15. The process of claim 1, wherein the water content in the treatment composition produces a treated fly ash having less than 1.5 wt % water, based on the total wt % of the fly ash.

16. The process of claim 1, wherein the treatment composition is supplied as a liquid spray.

17. The process of claim 1, wherein the treatment composition is supplied as a vapor.

18. The process of claim 1, wherein the step of contacting the ammonia-laden fly ash with the treatment composition comprises the step of determining the amount of the treatment composition to be applied to the ammonia-laden fly ash based on the flow rate of the fly ash.

19. The process of claim 1, wherein the step of contacting the ammonia-laden fly ash with the treatment composition comprises the step of pressurizing the treatment composition prior to contacting the treatment composition with the fly ash.

20. The process of claim 1, further comprising the step of contacting the fly ash with a treating fluid comprising an agent selected from the group consisting of sacrificial agents, surfactants, dispersants, chemical activators, coating compositions, and combinations thereof.

21. The process of claim 1, wherein the treatment composition further comprises at least one alkaline salt.

22. The process of claim 21, wherein the treatment composition further comprises at least one alkaline salt selected from the group consisting of sodium carbonate, sodium aluminate, and sodium silicate.

* * * * *